US010576432B2

(12) United States Patent
Sugawara et al.

(10) Patent No.: US 10,576,432 B2
(45) Date of Patent: Mar. 3, 2020

(54) POLYIMIDE AND/OR POLYAMIDEIMIDE POROUS BODY AND METHOD FOR MANUFACTURING SAME, METHOD FOR SEPARATION AND/OR ADSORPTION, SEPARATION MATERIAL, ADSORPTION MATERIAL, FILTER MEDIA, LAMINATE, AND FILTER DEVICE

(71) Applicant: Tokyo Ohka Kogyo Co., Ltd., Kanagawa (JP)

(72) Inventors: Tsukasa Sugawara, Kanagawa (JP); Masanori Ichikawa, Kanagawa (JP); Jun Koshiyama, Kanagawa (JP); Mitsuharu Tobari, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 130 days.

(21) Appl. No.: 15/547,597

(22) PCT Filed: Feb. 3, 2016

(86) PCT No.: PCT/JP2016/053255
§ 371 (c)(1),
(2) Date: Jul. 31, 2017

(87) PCT Pub. No.: WO2016/125832
PCT Pub. Date: Aug. 11, 2016

(65) Prior Publication Data
US 2018/0021739 A1    Jan. 25, 2018

(30) Foreign Application Priority Data
Feb. 6, 2015 (JP) ................. 2015-022242

(51) Int. Cl.
*B01D 71/64* (2006.01)
*C08J 9/26* (2006.01)
*B01J 20/26* (2006.01)

(52) U.S. Cl.
CPC ............ *B01D 71/64* (2013.01); *B01J 20/262* (2013.01); *C08J 9/26* (2013.01)

(58) Field of Classification Search
CPC ............ B01D 71/64; C08J 9/26; B01J 20/262
See application file for complete search history.

(56) References Cited

U.S. PATENT DOCUMENTS

| 7,771,911 B2 | 8/2010 | Hada et al. |
| 2006/0014098 A1 | 1/2006 | Hada et al. |
| 2006/0231485 A1* | 10/2006 | Yoshinaga ............ B01D 53/228 210/500.39 |
| 2007/0036959 A1 | 2/2007 | Yamato et al. |
| 2010/0216050 A1 | 8/2010 | Matsui et al. |
| 2016/0072110 A1 | 3/2016 | Sugawara et al. |
| 2016/0185932 A1 | 6/2016 | Sugawara |

FOREIGN PATENT DOCUMENTS

| JP | 58-157824 | 9/1983 |
| JP | 9-57069 | 3/1997 |
| JP | 2007-92078 | 4/2007 |
| JP | 2009-99309 | 5/2009 |
| JP | 4637476 | 2/2011 |
| JP | 2012-111790 | 6/2012 |
| TW | 200514616 | 5/2005 |
| WO | 2005/030849 | 4/2005 |
| WO | 2014/175011 | 10/2014 |
| WO | 2015/020101 | 2/2015 |

OTHER PUBLICATIONS

International Search Report dated May 10, 2016 in International (PCT) Application No. PCT/JP2016/053255.
Wang et al., "Simple Method for Preparation of Porous Polyimide Film with an Ordered Surface Based on in Situ Self-Assembly of Polyamic Acid and Silica Microspheres", Langmuir, vol. 26, No. 23, pp. 18357-18361, 2010.
Nakamura et al., "Effect of oxygen plasma etching on adhesion between polyimide films and metal", Thin Solid Films 290-291, pp. 367-369, 1996.
Office Action dated Aug. 27, 2019 in corresponding Taiwanese Patent Application No. TW105103682.

* cited by examiner

*Primary Examiner* — Vishal V Vasisth
(74) *Attorney, Agent, or Firm* — Wenderoth, Lind & Ponack, L.L.P.

(57) ABSTRACT

Provided are a polyimide and/or polyamideimide porous body and method for manufacturing same, method for separation and/or adsorption using the porous body, a separation material, adsorption material, and filter media composed of the porous body, a laminate, and a filter device. A polyimide and/or polyamideimide porous body in which the polyimide and/or polyamideimide has at least one group selected from the group consisting of a carboxy group, a salt-type carboxy group, and a —NH— bond.

13 Claims, No Drawings

POLYIMIDE AND/OR POLYAMIDEIMIDE POROUS BODY AND METHOD FOR MANUFACTURING SAME, METHOD FOR SEPARATION AND/OR ADSORPTION, SEPARATION MATERIAL, ADSORPTION MATERIAL, FILTER MEDIA, LAMINATE, AND FILTER DEVICE

This application is a 371 of PCT/JP2016/053255, filed Feb. 3, 2016.

TECHNICAL FIELD

The present invention relates to: a polyimide and/or polyamideimide porous body; a method for producing the same; a method for separation and/or adsorption using the porous body; a separation material, an adsorbent material and a filter medium comprising the porous body; and a laminate and a filter device comprising the porous body.

BACKGROUND ART

In relation to semiconductor devices, with the increasing demand for higher performance, higher functionality, and lower power consumption, circuit patterns have been increasingly miniaturized, leading to a significantly growing demand for removal of contaminant metals that would reduce the production yield. Therefore, it is desirable that contaminant metals such as iron or nickel are not contained in a chemical solution such as a protective film formation solution for imparting hydrophobicity to a substrate, or a silicon wafer cleaning solution.

Such chemical solutions for use in the process of manufacturing semiconductor devices are cleaned beforehand to remove contaminant metals such as iron and nickel by way of a filter device or the like. The filter device ordinarily includes a filter medium with a porous membrane.

From the viewpoint of removing impurities such as metal ions, porous membranes capable of removing minute substances such as nanoparticles are desirable. Nylon, polyethylene, polypropylene, PTFE, and the like are typically used as filter films capable of removing impurities from a chemical solution or a resin material for a semiconductor device or the like. For example, it is known that organic impurities can also be removed by way of a filter film of nylon or the like (for example, see Patent Document 1).

Patent Document 1: Japanese Patent No. 4637476

DISCLOSURE OF THE INVENTION

Problems to be Solved by the Invention

However, membranes made of nylon suffer from problems such as poor acid resistance, thus being difficult to be cleaned with an acid, and being difficult to remove impurities mixed in or adhered to the filter itself. Further, films made of polyethylene have a problem of a low removal rate of impurities such as iron and nickel that should be removed from the chemical solution used in the manufacturing process of semiconductor devices.

Furthermore, porous membranes for use in filter media are industrially used in heavy rotation, and thus preferably have durability such as high stress resistance, high fracture elongation, etc.

The present invention has been made in view of the above circumstances, and it is an object of the present invention to provide: a polyimide and/or polyamideimide porous body having an excellent capability of removing impurities such as metals, as well as excellent stress resistance, fracture elongation, etc.; a method for manufacturing the same; a method for separation and/or adsorption using the porous body; a separation material, an adsorbent material and a filter medium comprising the porous body; and a laminate and a filter device comprising the porous body.

Means for Solving the Problems

The present inventors have completed the present invention by finding that a polyimide and/or polyamideimide porous body having at least one group selected from the group consisting of a carboxy group, a salt-type carboxy group, and an —NH— bond has an excellent capability of removing metals by way of at least the porous structure without sacrificing the stress resistance, fracture elongation, etc. derived from the polyimide and/or the polyamideimide.

A first aspect of the present invention is a polyimide and/or polyamideimide porous body comprising at least one group selected from the group consisting of a carboxy group, a salt-type carboxy group, and an —NH— bond.

A second aspect of the present invention is a method for manufacturing the polyimide and/or polyamideimide porous body according to the first aspect of the present invention, the method comprising forming a carboxy group or a salt-type carboxy group from part of an imide bond in the polyimide and/or polyamideimide.

A third aspect of the present invention is a method for separation and/or adsorption which may comprise at least one selected from the group consisting of filtration, isolation, removal, trapping, purification, and sieving using the polyimide and/or polyamideimide porous body according to the first aspect of the present invention.

A fourth aspect of the present invention is a separation material comprising the polyimide and/or polyamideimide porous body according to the first aspect of the present invention.

A fifth aspect of the present invention is an adsorbent material comprising the polyimide and/or polyamideimide porous body according to the first aspect of the present invention.

A sixth aspect of the present invention is a filter medium comprising the polyimide and/or polyamideimide porous body according to the first aspect of the present invention.

A seventh aspect of the present invention is a filter medium comprising the polyimide and/or polyamideimide porous body according to the sixth aspect of the present invention.

An eighth aspect of the present invention is a filter device comprising the polyimide and/or polyamideimide porous body according to the first aspect of the present invention.

Effects of the Invention

The present invention can provide a polyimide and/or polyamideimide porous body having an excellent capability of removing impurities such as metals, as well as excellent stress resistance, fracture elongation, etc.; a method for manufacturing the same; a method for separation and/or adsorption using the porous body; a separation material, an adsorbent material and a filter medium comprising the porous body; and a laminate and a filter device comprising the porous body.

PREFERRED MODE FOR CARRYING OUT THE INVENTION

Embodiments of the present invention will be hereinafter described in further detail. However, it should be noted that the present invention shall not in the least be limited to the following embodiments, and can be implemented as appropriately modified within the scope of the object of the present invention. In the present specification, the description of, for example, "P and/or Q" as in "polyimide and/or polyamideimide" and the like, and the description of, for example, "P, Q, and/or R" as in "carboxy group, salt-type carboxy group and/or —NH— bond" respectively refer to "at least one member selected from the group consisting of P and Q" and "at least one member selected from the group consisting of P, Q, and R." This applies to other descriptions using "and/or." Here P, Q and R are arbitrary terms.

The polyimide and/or polyamideimide porous body according to the first aspect of the present invention contains at least one polyimide and/or polyamideimide selected from the group consisting of a carboxy group, a salt-type carboxy group, and an —NH— bond.

The polyimide and/or polyamideimide porous body of the present invention contains a resin and may be substantially composed only of a resin. Specifically, the resin content is 95% by mass or more, preferably 98% by mass or more, and more preferably 99% by mass or more. Resins contained in the polyimide and/or polyamideimide porous body of the present invention are preferably polyimides and/or polyamideimides, more preferably polyimide-containing resins, and polyimide alone may also be used. In the present specification, the polyimide and/or polyamideimide may also be referred to as "polyimide resin" in some cases.

Polyimides and/or polyamideimides contained in the polyimide and/or polyamideimide porous body of the present invention (hereinafter sometimes abbreviated to "polyimide resin porous body" or "porous body") contain at least one group selected from the group consisting of a carboxy group, a salt-type carboxy group, and an —NH— bond. Preferably, the polyimide and/or polyamideimide has a carboxy group, a salt-type carboxy group, and/or an —NH— bond at a position other than the main chain terminal of the polyimide and/or polyamideimide.

In the present specification, "salt-type carboxy group" means a group formed by substituting a hydrogen atom in the carboxy group with a cation moiety. In the present specification, a "cation moiety" may be a cation itself that is in a completely ionized state, or a cation moiety that is ionically bonded to —COO⁻ and is in a state of virtually no charge, or alternatively may be a cationic constituent having a partial charge that is an intermediate state therebetween. In the case where the "cation moiety" is an M ion moiety of n-valent metal M, the cation itself is expressed by $M^{n+}$, and the cation moiety is expressed by "M" in "—COOM$_{1/n}$."

In the present invention, cations formed in ion dissociation of compounds described compounds containing chemical etching solutions that will be described later may be mentioned as the "cation moiety," and representative examples thereof include ion components or organic alkali ion components. For example, when the alkali metal ion component is a sodium ion component, the cation itself is a sodium ion ($Na^+$); the cationic constituent is an element represented by "Na" in "—COONa"; and the cationic constituent having a partial charge is $Na^{\delta+}$. In the present invention, the cation moiety is not particularly limited, and any of inorganic components, organic components such as $NH_4^+$, $N(CH_3)_4^+$, and the like are possible. Examples of inorganic components include metal elements such as alkali metals such as Li, Na, and K, and alkali earth metals such as Mg and Ca. Organic components, particularly organic alkali ion components including $NH_4^+$, for example, quaternary ammonium cations represented by $NR_4^+$ wherein four R's may be the same or different and each represent an organic group. The organic group as R is preferably an alkyl group, and more preferably an alkyl group having 1 to 6 carbon atoms. Examples of quaternary ammonium cations include $N(CH_3)_4^+$ and the like.

In the present invention, the state of the "salt-type carboxy group" and "cation moiety" is not particularly limited and may ordinarily depend upon the environment where the polyimide and/or the polyamideimide exists, such as in an aqueous solution, an organic solvent, a dried state, or the like. When the cation moiety is a sodium ion moiety, for example, in an aqueous solution, there is a possibility that the moiety is dissociated into —COO⁻ and $Na^+$, while, in an organic solvent or in a dried state, there is a high possibility that —COONa is not dissociated.

The polyimide and/or polyamideimide in the present invention has at least one group selected from the group consisting of a carboxy group, a salt-type carboxy group, and an —NH— bond, but ordinarily has both the carboxyl group and/or the salt-type carboxy group and the —NH— bond. As to the carboxy group and/or the salt-type carboxy group, the polyimide and/or the polyamideimide may have only the carboxy group, may have only the salt-type carboxy group, or may have both the carboxy group and the salt-type carboxy group. The ratio between the carboxy group and the salt-type carboxy group in the polyimide and/or the polyamideimide, even in identical polyimides and/or polyamideimides, may vary depending upon the environment where the polyimide and/or the polyamideimide exist, and also upon the concentration of the cation moiety.

For the polyimide, the total number of moles of the carboxy group and the salt-type carboxy group in the polyimide and/or polyamideimide in the present invention is ordinarily equimolar to the —NH— bond, and in particular, in the method for manufacturing a polyimide porous body that will be described later, when the carboxy group and/or the salt-type carboxy group is formed from part of an imide bond in the polyimide, an —NH— bond is also substantially simultaneously formed, and the total number of moles of the carboxy group and the salt-type carboxy group is equimolar to the formed —NH— bond. For the polyamideimide, the total number of moles of the carboxy group and the salt-type carboxy group in the polyamideimide is not necessarily equimolar to the —NH— bond, but depends on the conditions of an imide bond opening step such as chemical etching, which will be described later. The —NH— bond is preferably part of an amide bond (—NH—C(=O)—).

The polyimide and/or the polyamideimide in the present invention preferably has at least one unit selected from the group consisting of constitutional units represented by the following formulae (3) to (6). For the polyimide, constitutional units represented by the following formula (3) and/or formula (4) are preferred, and, for the polyamideimide, constitutional units represented by the following formula (5) and/or (6) are preferred.

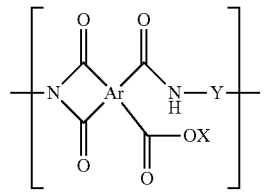

(3)

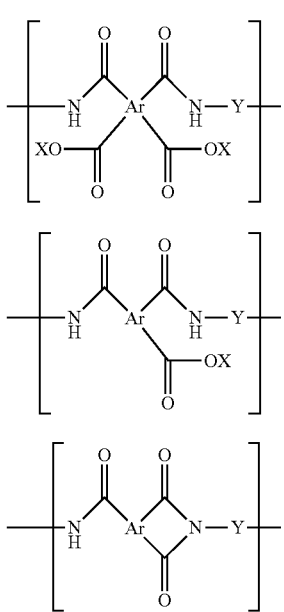

In the above formula, X is the same or different, and is a hydrogen atom or a cation moiety. Ar is an aryl group and may be the same as an aryl group represented by Ar to which the carbonyl group is bonded in a repeating unit represented by the formula (1) constituting polyamide acid which is described later or a repeating unit represented by the formula (2) constituting aromatic polyimide. Y is a divalent residue excluding the amino group of the diamine compound, and may be the same as an aryl group represented by Ar to which N is bonded in a repeating unit represented by the formula (1) constituting the polyamide acid that is described later or a repeating unit represented by the formula (2) constituting the aromatic polyimide.

The polyimide and/or the polyamideimide in the present invention preferably respectively have a constituent unit represented by the formula (3) and/or the formula (4) and a constituent unit represented by the formula (5) formed as a result of the ring-opening of part of the imide bond ([—C(=O)]$_2$—N—) possessed by general polyimides and/or polyamideimides. For the polyamideimide, however, the present inventors have found that the object of the present invention can be attained only by having an amide bond (—NH—C(=O)—) originally possessed irrespective of the ring-opening of an imide bond possessed by a general polyamideimide. Nonetheless, the polyamideimide preferably has a constituent unit represented by the formula (5) formed as a result of the ring-opening of part of imide bond originally possessed by the polyamideimide.

The polyimide and/or the polyamideimide in the present invention may be a polyimide and/or polyamideimide porous body having at least one group selected from the group consisting of a carboxy group, a salt-type carboxy group, and an —NH— bond, by the ring-opening of part of the imide bond. The unconversion rate in the ring-opening of part of the imide bond is determined as follows.

(1) For the polyimide and/or polyamideimide porous body not subjected to an imide bond opening step, which will be described later (provided that, when varnish for the preparation of the porous body contains a polyamide acid, an imidization reaction is regarded as having been substantially completed in a burning step), a value (X1) is determined by dividing the area of a peak representing the imide bond measured by the Fourier transform infrared spectroscopy (FT-IR) apparatus by the area of a peak representing benzene also measured by the FT-IR apparatus.

(2) Regarding the resultant polyimide and/or polyamideimide porous body, using the same polymer (varnish) as the porous body for which the value (X1) was determined, for the polyimide and/or polyamideimide porous body after the imide bond opening step that will be described later, a value (X2) is determined by dividing the area of a peak representing the imide bond measured by the Fourier transform infrared spectroscopy (FT-IR) apparatus by the area of a peak representing benzene also measured by the FT-IR apparatus.

Unconversion rate (%)=(X2)÷(X1)×100    (3)

For the polyimide and/or polyamideimide porous body of the present invention, the unconversion rate is preferably 60% or more, more preferably 70% to 99.5%, and further preferably 80% to 99%. A porous body containing polyamideimide originally contains an —NH— bond that constitutes an amide bond (—NH—C(=O)—) that is originally contained independently from the ring-opening of the imide bond, and thus, in this case, the unconversion rate may be 100%.

When the polyimide and/or polyamideimide porous body of the present invention is a polyimide porous body, a value is determined as an imidization ratio by dividing the area of a peak representing the imide bond measured by the Fourier transform infrared spectroscopy (FT-IR) apparatus by the area of a peak representing benzene also measured by the FT-IR apparatus. For the polyimide, the X2 value as described above is preferably 1.2 or more, more preferably 1.2 to 2, further preferably 1.3 to 1.6, even more preferably 1.30 to 1.55, and most preferably 1.35 to less than 1.5. Further, in the present invention, the imidization ratio for X1 is preferably 1.5 or more. For the imidization ratio, the larger the numeral, the greater the number of imide bonds, that is, the less the ring-opened imide bonds described above.

The polyimide and/or polyamideimide porous body of the present invention is preferably a porous body containing pores having a curved surface as an inner surface. More preferably, most of the pores (preferably, substantially all of the pores) in the porous body are formed of a curved surface. In the present specification, the pores "having a curved surface as an inner surface" means that at least the inner surface of the pores constituting the porous body has a curved surface in at least part of the inner surface. Substantially all of the inner surfaces of the pores in the porous body of the present invention are preferably a curved surface.

Since the pores in the porous body have a curved surface as an inner surface, when a fluid is passed into the polyimide and/or polyamideimide porous body of the present invention, the fluid can satisfactorily penetrate into the pores in the porous body, thus can be brought into satisfactory contact with the inner surface of the pores, and in some cases, convection may occur along the curved surface of the inner surface. Thus, it is considered that minute substances such as metal particles present in the fluid are likely to be adsorbed in the recesses that may exist on the pores or on the inner surface of the pores in the porous body of the present invention.

In the polyimide and/or polyamideimide porous body of the present invention, the pores having a curved surface as an inner surface preferably form interconnected pores. Ordinarily, an interconnected pore is formed by connecting a plurality of pores having a curved surface as an inner surface, the entirety of which constitutes an interconnected pore, and a portion formed by adjacent pores having a curved surface as an inner surface constitutes such an interconnected pore. Interconnected pores can also be considered to be pores formed in a portion where fine particles used in the method for manufacturing a polyimide-based resin porous body, which will be described later, are in contact with each other. In the present invention, preferably, the interconnected pores have an opening in the surface of the porous body so that a fluid can pass through the inside of the porous body of the present invention, and is connected so that a flow path is ensured inside the porous body.

The polyimide and/or polyamideimide porous body of the present invention preferably internally has interconnected pores composed of pores in continuity, each having a curved surface as an inner surface. Therefore, when a fluid is passed into the porous body, the fluid is not only passed through the inside of the porous body, but also passed therethrough while in contact with the curved surface of the individual pores, increasing the area of contact with the inner surface of the pores. Consequently, it is considered that minute substances such as metal particles existing in the fluid are likely to be adsorbed onto the pores in the porous body.

The polyimide and/or polyamideimide porous body of the present invention can be produced by a method including a step of forming a carboxy group and/or a salt-type carboxy group from part of an imide bond in polyimide and/or polyamideimide (hereinafter referred to as "imide bond opening step"). In the imide bond opening step, as described above, when a carboxy group and/or a salt-type carboxy group is formed from part of the imide bond, theoretically, an —NH— bond equimolar to these groups is also substantially simultaneously formed. The imide bond opening step is preferably carried out by chemical etching, which will be described later.

However, when the resin contained in the polyimide and/or polyamideimide porous body is substantially composed of polyamideimide, the resin already has an —NH— bond without the imide bond opening step, contributing to favorable adsorption power. Accordingly, there is no need to decrease the flow rate of the fluid, and, thus, the imide bond opening step is not always necessary. Preferably, however, the imide bond opening step is carried out from the viewpoint of effectively attaining the object of the present invention.

The second aspect of the present invention is a method for manufacturing the polyimide and/or polyamideimide porous body according to the first aspect of the present invention, and includes the step of forming a carboxy group and/or a salt-type carboxy group from part of imide bonds in polyimide and/or polyamideimide (imide bond opening step).

In the method for manufacturing the polyimide and/or polyamideimide porous body according to the first aspect of the present invention, preferably, a molded body of a film or the like composed mainly of a polyimide and/or a polyamideimide (sometimes abbreviated to "polyimide and/or polyamideimide molded body") is prepared followed by the imide bond opening step. The polyimide and/or polyamideimide molded body to be subjected to the imide bond opening step may be porous or nonporous, and the shape thereof is not particularly limited. From the viewpoint of enhancing the porosity in the polyimide and/or polyamideimide porous body according to the first aspect of the present invention, preferably, the polyimide and/or polyamideimide molded body is porous and/or is preferably in the form of a thin shape such as a film.

As described above, the polyimide and/or polyamideimide molded body may be non-porous when subjected to the imide bond opening step. In this case, preferably, pores are formed after the imide bond opening step. A method of forming pores in the polyimide and/or polyamideimide molded body independent from whether it is before or after the imide bond opening step is preferably a method including a fine particle removing step in which fine particles are removed from a composite of a polyimide and/or a polyamideimide with fine particles (hereinafter also referred to as "polyimide-based resin-fine particle composite").

In the method for manufacturing a polyimide and/or polyamideimide porous body according to the first aspect of the present invention, (a) before the fine particle removing step, the composite of the polyimide and/or the polyamideimide with the fine particles may be subjected to the imide bond opening step, or alternatively, (b) after the fine particle removing step, the polyimide and/or polyamideimide molded body that has been rendered porous by performing the step may be subjected to the imide bond opening step. Preferably, however, the latter method (b) is adopted from the viewpoint of enhancing the porosity in the resultant polyimide and/or polyamideimide porous body.

The method for manufacturing the polyimide and/or polyamideimide porous body according to the first embodiment of the present invention will be described in more detail by mainly taking the form of a membrane (a porous membrane), which is a preferred embodiment. The film can be suitably produced using a varnish.

[Manufacture of Varnish]

Varnish production is carried out by mixing an organic solvent containing fine particles dispersed in advance therein with polyamide acid, or with polyimide or polyamideimide at any ratio, or by polymerizing tetracarboxylic dianhydride and diamine in an organic solvent containing fine particles dispersed therein in advance to form a polyamide acid, or by further subjecting the polyamide acid to imidization to form a polyimide. The final viscosity is preferably 300 to 2000 cP (0.3 to 2 Pa·s), and more preferably 400 to 1800 cP (0.4 to 1.8 Pa·s). When the viscosity of the varnish is in the above defined range, the formation of a uniform film is possible.

In the varnish, in preparing a polyimide-based resin-fine particle composite by burning (or drying when the burning is optional), fine particles of resin and polyamide acid or polyimide or polyamideimide may be mixed together so that the fine particle/polyimide-based resin ratio is 1 to 4 (mass ratio), and the fine particle/polyimide-based resin ratio is preferably 1.1 to 3.5 (mass ratio). Further, in preparing the polyimide resin-fine particle composite, fine particles and polyamide acid or polyimide or polyamideimide may be mixed together so that the fine particle/polyimide-based resin volume ratio is 1.1 to 5. Further, the fine particle/ polyimide resin ratio is further preferably 1.1 to 4.5 (volume ratio). When the mass ratio or the volume ratio of the fine particle/polyimide resin is not less than the lower limit value, pores having an appropriate density can be obtained as the porous body. When mass ratio or the volume ratio of the fine particle/polyimide resin is not more than the upper limit value, the film can be stably formed without posing a problem of an increase in viscosity or cracking in the film. In the present specification, the volume percentage and the volume ratio are values at 25° C.

<Fine Particles>

The fine particles used in the present invention may be formed of any material without particular limitation as long as the material is insoluble in the organic solvent used in the varnish and can be selectively removed after formation of the film. Examples of inorganic materials include metal oxides such as silica (silicon dioxide), titanium oxide, alumina ($Al_2O_3$), and calcium carbonate, and examples of organic materials include fine particles of organic polymers (resin fine particles) such as high molecular weight olefins (for example, polypropylene and polyethylene), polystyrene, acrylic resins (resins of methyl methacrylate, isobutyl methacrylate, polymethyl methacrylate (PMMA), etc.), epoxy resins, cellulose, polyvinyl alcohol, polyvinyl butyral, polyester, polyether, and polyethylenes.

Preferred materials to be used in the production of the polyimide resin porous body include silicas such as colloidal silica among inorganic materials, and PMMA of fine particles of organic polymers. Among all, spherical particles thereof are preferably selected, from the viewpoint of forming minute pores having a curved surface as an inner surface.

The fine particles of resin used in the present invention may be selected, for example, from ordinary linear polymers and publicly known depolymerizable polymers according to the purpose without particular limitation. The ordinary linear polymer is a polymer that undergoes random cleaving of molecular chains of the polymer during thermal decomposition, and the depolymerizable polymer is a polymer that is decomposed into monomers during thermal decomposition. Both the resins can be removed from the polyimide resin film by decomposing them into monomers, low molecular weight substances, or $CO_2$ at the time of heating. The decomposition temperature of the resin fine particles used is preferably 200 to 320° C., and further preferably 230 to 260° C. When the decomposition temperature is 200° C. or above, the film can be formed even when a solvent with a high boiling point is used for the varnish, and the range of the selection of burning conditions for the polyimide resin is widened. When the decomposition temperature is 320° C. or below, only the resin fine particles will be made to disappear without thermal damage to the polyimide-based resin.

Among these depolymerizable polymers, methyl methacrylate or isobutyl methacrylate (polymethyl methacrylate or polyisobutyl methacrylate) alone having a low thermal decomposition temperature or a copolymerized polymer containing them as the main component is preferable from the viewpoint of handling during pore formation.

The fine particles used in the present invention preferably have a high sphericity, from the viewpoint that an inner surface of the pores in the porous body formed is likely to have a curved surface. The particle diameter (average diameter) of the fine particles to be used may be, for example, 50 to 2000 nm, and preferably 200 to 1000 nm. When a polyimide resin porous body obtained by removing fine particles is used as a separation material or an adsorbent material, a fluid can be brought into full contact with the inner surface of the pores in the porous body, and adsorption of minute substances such as metal particles contained in the fluid can be efficiently performed. The particle diameter distribution index (d25/75) may be from 1 to 6, preferably from 1.6 to 5, and more preferably from 2 to 4. When the lower limit is 1.6 or more, particles can be efficiently filled in the inside of the membrane, and, thus, a flow channel is likely to be formed, advantageously contributing to an improved flow rate. Further, it is considered that pores of varied sizes are formed, causing the convection to change and contributing to improved adsorption. However, it should be noted that, if the particle diameter distribution index (d25/75) of the fine particles is 1 or more, even if it is less than 1.6, the flow rate and the adsorption rate are favorable and the fracture elongation is likely to be improved. It is to be noted that d25 and d75 are the values of the particle diameters of 25% and 75%, respectively, of the particle size distribution, and in this specification, d25 is the larger particle diameter.

Further, in the manufacturing method that will be described later, when the unburned composite is formed as a two-layered unburned composite film, the fine particles (B1) used for the first varnish and the fine particles (B2) used for the second varnish may be the same or different. In order to make the pores denser on the side that is in contact with the base material, the particle size distribution index of the fine particles (B1) is preferably smaller than or the same as that of the fine particles (B2). Alternatively, the sphericity ratio of the fine particles (B1) is preferably smaller than or the same as that of the fine particles (B2). Further, the particle diameter (average diameter) of the fine particles (B1) is preferably smaller than that of the fine particles (B2). In particular, the fine particles (B1) preferably have a diameter of 100 to 1000 nm (more preferably 100 to 600 nm) and the fine particles (B2) preferably have a diameter of 500 to 2000 nm (more preferably 700 to 2000 nm). When the diameter of the fine particles (B1) is smaller than the diameter of the fine particles (B2), the opening ratio of the pores on the surface of the obtained porous polyimide resin porous body can be made uniform and high, and the strength of the porous body (membrane) can be increased as compared with the case where the whole of the porous resin-based resin body is the particle diameter of the fine particles (B1).

In the present invention, in order to uniformly disperse the fine particles in the varnish, a dispersant may be further added together with the fine particles. The addition of the dispersant can allow polyamide acid, polyimide or polyamideimide to be more uniformly mixed with the fine particles, and fine particles in the molded or formed precursor film can be uniformly distributed. As a result, in order to provide a dense opening on the surface of the finally obtained polyimide-based resin porous body and to improve the air permeability of the polyimide-based resin porous body, interconnected pores through which the front and back surfaces of the porous body are efficiently connected can be formed.

The dispersant used in the present invention is not particularly limited and publicly known dispersants can be used. Examples of dispersants include, but are not limited to, anionic surfactants such as coconut fatty acid salts, castor sulfated oil salts, lauryl sulfate salts, polyoxyalkylene allyl phenyl ether sulfate salts, alkylbenzene sulfonic acids, alkyl benzene sulfonates, alkyl diphenyl ether disulfonates, alkyl naphthalene sulfonates, dialkyl sulfosuccinates, isopropyl phosphate, polyoxyethylene alkyl ether phosphate salts, polyoxyethylene allyl phenyl ether phosphate salts; cationic surfactants such as oleyl amine acetate, lauryl pyridinium chloride, cetyl pyridinium chloride, lauryl trimethyl ammonium chloride, stearyl trimethyl ammonium chloride, behenyltrimethylammonium chloride, didecyl dimethyl ammonium chloride; amphoteric surfactants such as cocoalkyldimethylamine oxide, fatty acid amidopropyldimethylamine oxide, alkylpolyaminoethylglycine hydrochloride, amidobetaine type activator, alanine type activator, lauryliminodipropionic acid and the like; nonionic surfactants such as polyoxyethylene octyl ether, polyoxyethylene decyl ether, polyoxyethylene lauryl ether, polyoxyethylene lauryl amine, polyoxyethylene oleyl amine, polyoxyethylene polystyryl phenyl ether, polyoxyalkylene polystyryl phenyl ether, etc., nonionic surfactants of polyoxyalkylene parimary alkyl ether or polyoxyalkylene secondary alkyl ether, and nonionic surfactants of other polyoxyalkylenes such as polyoxyethylene dilaurate, polyoxyethylene laurate, polyoxyethylenated castor oil, polyoxyethylenated hardened castor oil, sorbitan lauric acid ester, polyoxyethylene sorbitan lauric acid ester, fatty acid diethanol amide and the like; fatty acid alkyl esters such as octyl stearate and trimethylolpropane tridecanoate; and polyether polyols such as polyoxyalkylene butyl ether, polyoxyalkylene oleyl ether and trimethylolpropane tris (polyoxyalkylene) ether. Further, two or more of the above dispersants can be used as a mixture.

<Polyamide Acid>

The polyamide acid used in the present invention may be any one prepared by polymerizing appropriate tetracarboxylic dianhydride and diamine. The amounts of the tetracarboxylic dianhydride and the diamine are not particularly limited, and the amount of the diamine is preferably 0.50 to 1.50 mol, more preferably 0.60 to 1.30 mol, and most preferably 0.70 to 1.20 mol, based on 1 mol of the tetracarboxylic dianhydride.

The tetracarboxylic dianhydride can be appropriately selected from, tetracarboxylic dianhydrides that have been conventionally used as raw materials for synthesizing polyamide acids. The tetracarboxylic dianhydride may be an aromatic tetracarboxylic dianhydride or an aliphatic tetracarboxylic dianhydride, but from the viewpoint of the heat resistance of the resulting polyimide resin, an aromatic tetracarboxylic dianhydride is preferably used. The tetracarboxylic dianhydrides may be used in a combination of two or more thereof.

Preferred examples of the aromatic tetracarboxylic dianhydride include pyromellitic dianhydride, 1,1-bis(2,3-dicarboxyphenyl)ethane dianhydride, bis(2,3-dicarboxyphenyl)methane dianhydride, bis(3,4-dicarboxyphenyl)methane dianhydride, 3,3',4,4'-biphenyltetracarboxylic dianhydride, 2,3,3',4'-biphenyltetracarboxylic dianhydride, 2,2,6,6-biphenyltetracarboxylic dianhydride, 2,2-bis(3,4-dicarboxyphenyl)propane dianhydride, 2,2-bis(2,3-dicarboxyphenyl)propane dianhydride, 2,2-bis(3,4-dicarboxyphenyl)-1,1,1,3,3,3-hexafluoropropane dianhydride, 2,2-bis(2,3-dicarboxyphenyl)-1,1,1,3,3,3-hexafluoropropane dianhydride, 3,3',4,4'-benzophenonetetracarboxylic dianhydride, bis(3,4-dicarboxyphenyl)ether dianhydride, bis(2,3-dicarboxyphenyl)ether dianhydride, 2,2',3,3'-benzophenonetetracarboxylic dianhydride, 4,4-(p-phenylenedioxy)diphthalic dianhydride, 4,4-(m-phenylenedioxy)diphthalic dianhydride, 1,2,5,6-naphthalenetetracarboxylic dianhydride, 1,4,5,8-naphthalenetetracarboxylic dianhydride, 2,3,6,7-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 9,9-bisphthalic anhydride fluorene, and 3,3',4,4'-diphenylsulfonetetracarboxylic dianhydride. Examples of the aliphatic tetracarboxylic dianhydride include ethylenetetracarboxylic dianhydride, butanetetracarboxylic dianhydride, cyclopentanetetracarboxylic dianhydride, cyclohexanetetracarboxylic dianhydride, 1,2,4,5-cyclohexanetetracarboxylic dianhydride, and 1,2,3,4-cyclohexanetetracarboxylic dianhydride. Among these tetracarboxylic dianhydrides, 3,3',4,4'-biphenyltetracarboxylic dianhydride and pyromellitic dianhydride are preferred because of their inexpensiveness and ready availability. These tetracarboxylic dianhydrides may be used alone or as a mixture of two or more thereof.

The diamine can be appropriately selected from diamines that have been conventionally used as raw materials for synthesizing polyamide acids. The diamine may be an aromatic diamine or an aliphatic diamine, but from the viewpoint of the heat resistance of the resulting polyimide resin, an aromatic diamine is preferred. These diamines may be used in a combination of two or more thereof.

Examples of the aromatic diamine include diamino compounds having one phenyl group or about two to ten phenyl groups. Specifically, examples of the aromatic diamine include phenylenediamines and their derivatives, diaminobiphenyl compounds and their derivatives, diaminodiphenyl compounds and their derivatives, diaminotriphenyl compounds and their derivatives, diaminonaphthalenes and their derivatives, aminophenylaminoindanes and their derivatives, diaminotetraphenyl compounds and their derivatives, diaminohexaphenyl compounds and their derivatives, and cardo-type fluorenediamine derivatives.

The phenylenediamines are, for example, m-phenylenediamine and p-phenylenediamine. The phenylenediamine derivatives are diamines to which alkyl groups, such as a methyl group or an ethyl group, are bound, such as 2,4-diaminotoluene and 2,4-triphenylenediamine.

The diaminodiphenyl compounds are obtained by linkage of two aminophenyl groups at their phenyl groups. For example, the diaminodiphenyl compounds are 4,4'-diaminobiphenyl and 4,4'-diamino-2,2'-bis(trifluoromethyl)biphenyl.

Alternatively, the diaminodiphenyl compounds are obtained by linkage of two aminophenyl groups at their phenyl groups via another group. The linkage is, for example, an ether linkage, a sulfonyl linkage, a thioether linkage, a linkage of an alkylene or its derivative group, an imino linkage, an azo linkage, a phosphine oxide linkage, an amide linkage, or an ureylene linkage. The alkylene linkage is a linkage of an alkylene having about 1 to 6 carbon atoms, and its derivative group is an alkylene group whose one or more hydrogen atoms have been replaced by, for example, halogen atoms.

Examples of diaminodiphenyl compounds include 3,3'-diaminodiphenyl ether, 3,4'-diaminodiphenyl ether, 4,4'-diaminodiphenyl ether, 3,3'-diaminodiphenyl sulfone, 3,4'-diaminodiphenyl sulfone, 4,4'-diaminodiphenyl sulfone, 3,3'-diaminodiphenylmethane, 3,4'-diaminodiphenylmethane, 4,4'-diaminodiphenylmethane, 4,4'-diaminodiphenyl sulfide, 3,3'-diaminodiphenyl ketone, 3,4'-diaminodiphenyl ketone, 2,2-bis(p-aminophenyl) propane, 2,2'-bis(p-aminophenyl)hexafluoropropane, 4-methyl-2,4-bis(p-aminophenyl)-1-pentene, 4-methyl-2,4-bis(p-aminophenyl)-2-pentene, iminojianirin, 4-methyl-2,4-bis(p-aminophenyl)pentane, bis(p-aminophenyl) phosphine oxide, 4,4'-diaminoazobenzene, 4,4'-diaminodiphenylurea, 4,4'-diaminodiphenylamide, 1,4-bis(4-aminophenoxy)benzene, 1,3-bis(3-aminophenoxy)benzene, 4,4'-(4-aminophenoxy)biphenyl, bis[4-(4-aminophenoxy) phenyl]sulfone, bis[4-(3-aminophenoxy)phenyl]sulfone, 2,2-bis[4-(4-aminophenoxy)phenyl]propane, 2,2-bis[4-(4-aminophenoxy)phenyl]hexafluoropropane.

Among them, p-phenylenediamine, m-phenylenediamine, 2,4-diaminotoluene, and 4,4'-diaminodiphenyl ether are preferred, for example, from the viewpoint of price and easy availability.

The diaminotriphenyl compound is formed by linkage of two aminophenyl groups and one phenylene group, all of which are each linked through another group. The "another group" is selected from the same groups as in the diaminodiphenyl compounds. Examples of the diaminotriphenyl compounds include 1,3-bis(m-aminophenoxy)benzene, 1,3-bis(p-aminophenoxy)benzene, and 1,4-bis(p-aminophenoxy)benzene.

Examples of diaminonaphthalenes include 1,5-diaminonaphthalene and 2,6-diaminonaphthalene.

Examples of aminophenylaminoindanes include 5- or 6-amino-1-(p-aminophenyl)-1,3,3-trimethylindane.

Examples of diaminotetraphenyl compounds include 4,4'-bis(p-aminophenoxy)biphenyl, 2,2'-bis[p-(p'-aminophenoxy)phenyl]propane, 2,2'-bis[p-(p'-aminophenoxy)biphenyl]propane, 2,2'-bis[p-(m-aminophenoxy)phenyl]benzophenone and the like.

Examples of cardo-type fluorenediamine derivatives include 9,9-bisaniline fluorene and the like.

The aliphatic diamine has, for example, about 2 to 15 carbon atoms, and specifically, examples thereof include pentamethylenediamine, hexamethylenediamine, and heptamethylenediamine.

The aliphatic diamine may be a compound having at least one substituent selected from the group consisting of halogen atoms and methyl, methoxy, cyano, and phenyl groups for hydrogen atoms of the diamine.

The polyamide acid to be used in the present invention may be produced by any method and, for example, can be produced by a known method, for example, by reacting an acid and a diamine component in an organic solvent.

The reaction of a tetracarboxylic dianhydride and a diamine is ordinarily performed in an organic solvent. The organic solvent to be used for the reaction of a tetracarboxylic dianhydride and a diamine may be any organic solvent that can dissolve the tetracarboxylic dianhydride and the diamine without reacting with the tetracarboxylic dianhydride and the diamine. The organic solvent may be a single solvent or a mixture of two or more solvents.

Examples of the organic solvent to be used for the reaction of a tetracarboxylic dianhydride and a diamine include nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea; lactone polar solvents, such as β-propiolactone, γ-butyrolactone, γ-valerolactone, δ-valerolactone, γ-caprolactone, and ε-caprolactone; dimethyl sulfoxide; acetonitrile; fatty acid esters, such as ethyl lactate and butyl lactate; ethers, such as diethylene glycol dimethyl ether, diethylene glycol diethyl ether, dioxane, tetrahydrofuran, methyl cellosolve acetate, and ethyl cellosolve acetate; and phenol solvents, such as cresols. These organic solvents may be used alone or as a mixture of two or more thereof. Among them, a combination of the nitrogen-containing polar solvent and the lactone-based polar solvent is preferred. The amount of the organic solvent is not particularly limited but is desirably such that the content of the resulting polyamide acid is 5% to 50% by mass.

Among these organic solvents, from the viewpoint of the solubility of the resulting polyamide acid, preferred are nitrogen-containing polar solvents, such as N-methyl-2-pyrrolidone, N,N-dimethylacetamide, N,N-diethylacetamide, N,N-dimethylformamide, N,N-diethylformamide, N-methylcaprolactam, and N,N,N',N'-tetramethylurea. From the viewpoint of film formation and the like, a mixed solvent containing a lactone-based polar solvent such as γ-butyrolactone added thereto may be used, and the content of the lactone-based polar solvent in the whole organic solvent is 1 to 20% by mass, more preferably 5 to 15% by mass.

The polymerization temperature is typically −10 to 120° C. and preferably 5 to 30° C. The polymerization time varies depending on the raw material composition and is ordinarily 3 to 24 hours (hr). The organic solvent solution of the polyamide acid prepared under such conditions preferably has an intrinsic viscosity in the range of 1000 to 100000 centipoises (cP), more preferably in the range of 5000 to 70000 cP.

<Polyimide>

The polyimide used in the present invention can be any known polyimide, without restricted by its structure and molecular weight, as long as the polyimide is soluble in the organic solvent to be used in the varnish of the present invention. The side chain of the polyimide may have a condensable functional group, such as a carboxy group, or a functional group enhancing the cross-linking reaction during burning.

In order to make the polyimide soluble in an organic solvent, it is effective to use a monomer for introducing a flexible bend structure into the main chain, for example, to use an aliphatic diamine, such as ethylenediamine, hexamethylenediamine, 1,4-diaminocyclohexane, 1,3-diaminocyclohexane, or 4,4'-diaminodicyclohexylmethane; an aromatic diamine, such as 2-methyl-1,4-phenylenediamine, o-tolidine, m-tolidine, 3,3'-dimethoxybenzidine, or 4,4'-diaminobenzanilide; a polyoxyalkylenediamine, such as polyoxyethylenediamine, polyoxypropylenediamine, or polyoxybutyrenediamine; a polysiloxanediamine; 2,3,3',4'-oxydiphthalic anhydride, 3,4,3',4'-oxydiphthalic anhydride, or 2,2-bis(4-hydroxyphenyl)propanedibenzoate-3,3',4,4'-tetracarboxylic dianhydride. It is also effective to use a monomer containing a functional group for improving the solubility in an organic solvent, for example, to use a fluorinated diamine, such as 2,2'-bis(trifluoromethyl)-4,4'-diaminobiphenyl or 2-trifluoromethyl-1,4-phenylenediamine. Furthermore, in addition to the monomer for improving the solubility of the polyimide, a monomer that is mentioned in the paragraph describing the polyamide acid may be used within a range that does not inhibit the solubility.

The polyimide soluble in an organic solvent to be used in the present invention may be produced by any method without any limitation in particular, and can be produced by a known method of, for example, chemically imidizing or thermally imidizing a polyamide acid and dissolving the imidized polyimide in an organic solvent. Examples of such polyimides include aliphatic polyimide (full-aliphatic polyimides) and aromatic polyimides, and aromatic polyimides are preferred. The aromatic polyimide may be one prepared by a thermal or chemical ring-closing reaction of a polyamide acid having repeating units represented by Formula (1) or one prepared by dissolving a polyimide having repeating units represented by Formula (2) in a solvent. In the formulae, Ar represents an aryl group.

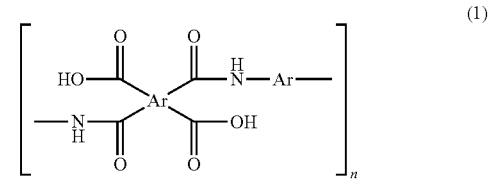

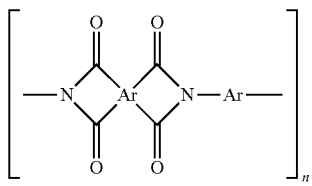

(2)

<Polyamideimide>

For the polyamideimide used in the present invention, the structure and the molecular weight are not particularly limited, and publicly known polyamideimides are usable as long as the polyamideimides are soluble in organic solvents in varnish in the present invention. The polyamideimide may have on its side chain a condensable functional group or a functional group that promotes a crosslinking reaction or the like during burning.

Further, polyamideimides produced by reacting any trimellitic anhydride with diisocyanate, or by reacting any reactive derivative of trimellitic anhydride with a diamine to give a precursor polymer and imidizing the precursor polymer may be used without particular limitation.

Examples of any trimellitic anhydrides or reactive derivatives thereof include trimellitic anhydrides, trimellitic anhydride acid halides such as trimellitic anhydride chloride, and trimellitic anhydride esters.

Examples of any diisocyanates include meta-phenylene diisocyanate, p-phenylene diisocyanate, o-tolidine diisocyanate, p-phenylene diisocyanate, m-phenylene diisocyanate, 4,4'-oxybis(phenyl isocyanate), 4,4'-diisocyanate diphenylmethane, bis[4-(4-isocyanate phenoxy)phenyl]sulfone, 2,2'-bis[4-(4-isocyanate phenoxy)phenyl]propane, 2,4-tolylene diisocyanate, 2,6-tolylene diisocyanate, 4,4'-diphenylmethane diisocyanate, 3,3'-dimethyl-4,4'-diisocyanate, 3,3'-diethyl-4,4'-diisocyanate, isophorone diisocyanate, hexamethylene diisocyanate, 4,4'-dicyclohexylmethane diisocyanate, m-xylene diisocyanate, p-xylene diisocyanate, naphthalene diisocyanate and the like.

Any diamines include those exemplified above in connection with the polyamide acid.

<Organic Solvent>

The organic solvent used for the varnish is not particularly limited as long as it can dissolve the polyamide acid and/or the polyimide resin and does not dissolve the fine particles. Examples thereof include those exemplified above in connection with solvents used in the reaction between the tetracarboxylic dianhydride and the diamine. The solvents may be used alone or in combination of two or more.

Among all components in the varnish, the content of the mixed solvent (S) is preferably, from 50 to 95% by mass, more preferably from 60 to 85% by mass. The solid content of the varnish is preferably 5 to 50% by mass, more preferably 15 to 40% by mass.

Further, in the manufacturing method that will be described later, when the unburned composite is formed as a two-layered unburned composite film, the volume ratio of the polyamide acid, polyimide or polyamideimide (A1) and fine particles (B1) in the first varnish is preferably 19:81 to 45:65. When the fine particle volume is 65 or more when the total volume is presumed to be 100, the particles are uniformly dispersed, and when the fine particle volume is 81 or less, the particles do not agglomerate and are dispersed, so that pores are uniformly formed on the substrate side of the polyimide-based resin molded body. In the second varnish, the volume ratio of the polyamide acid, polyimide or polyamideimide (A2) to the fine particles (B2) is preferably 20:80 to 50:50. When the fine particle volume is 50 or more when the total volume is presumed to be 100, the particles are uniformly dispersed, and when the fine particle volume is 80 or less, the particles do not agglomerate, and cracks and the like do not occur on the surface. Accordingly, polyimide-based resin porous bodies having favorable mechanical properties such as stress resistance, fracture elongation, etc. can be stably formed.

Regarding the volume ratio, the second varnish preferably has a smaller particle content ratio than the first varnish. When the above requirement is satisfied, even if fine particles are filled in the polyamide acid, polyimide, or polyamideimide at a high density, the strength and flexibility of the unburned composite, the polyimide-based resin-fine particle composite, and the polyimide-based resin porous body can be ensured. Further, the production cost can be lowered by providing a layer having a low fine particle content.

In addition to the above components, from the viewpoints of imparting antistatic properties, imparting flame retardancy, performing low-temperature burning, imparting releasability, coatability, etc., publicly known additives, for example, antistatic agents, flame retardants, chemical imidizing agents, condensing agents, release agents, and surface modifiers can be incorporated according to need.

[Production of Unburned Composite]

Regarding the molding of the unburned composite containing the polyamide acid or the polyimide-based resin and the fine particles, film formation is carried out by coating the varnish on a substrate and drying the coating at 0 to 120° C. (preferably 0 to 100° C.) under atmospheric pressure or in vacuum, more preferably at 60 to 95° C. (still more preferably 65 to 90° C.) under atmospheric pressure. A release layer may be, if necessary, provided on the substrate. Further, in the production of the unburned composite, before the production (burning step) of the polyimide resin-fine particle composite that will be described later, the step of dipping in a solvent containing water, the step of pressing, the step of drying after the dipping step may be optionally provided.

The release layer may be prepared by coating a release agent on a substrate and drying or baking the coating. Publicly known release agents such as alkyl phosphate ammonium salt-based, fluorine-based or silicone release agents can be used as the release agent without particular limitation. When the unburned composite film containing the dried polyamide acid or polyimide resin and fine particles is released from the substrate, the release agent remains slightly on the release surface of the unburned composite film. Since the remaining release agent can affect the wettability of the surface of the porous polyimide resin body and contamination of impurities, the remaining release agent is preferably removed.

Therefore, preferably, the unburned composite separated from the substrate is washed with organic solvents or the like. The unburned composite may be washed by a method selected from publicly known methods such as a method in which the unburned composite is dipped in a washing solution and is then taken out, and a method in which shower washing is carried out. Furthermore, in order to dry the unburned composite after washing, publicly known methods such as air-drying of the unburned composite after washing at room temperature, warming to an appropriate predetermined temperature in a thermostatic chamber, etc. may be applied without particular limitation. For example, a method in which the end of the unburned composite is fixed to SUS frame or the like for deformation prevention purposes may also be adopted.

On the other hand, when a substrate as such used without the provision of a release layer in film formation of the unburned composite, the step of forming the release layer and the step of washing the unburned composite film can be omitted.

When the unburned composite is formed in a two-layered structure, a method may be adopted in which the first varnish as such is coated on a substrate such as a glass substrate and drying the coating at 0 to 120° C. (preferably 0 to 90° C.) under atmospheric pressure or in vacuum, more preferably at 10 to 100° C. (still more preferably 10 to 90° C.) under atmospheric pressure to form a first unburned composite having a layer thickness of 1 to 5 μm.

Subsequently, the second varnish is coated on the formed first unburned composite, and the coating is dried at 0 to 80° C. (preferably 0 to 50° C.) in the same manner as in the formation of the first unburned composite, more preferably at 10 to 80° C. (still more preferably 10 to 30° C.) under atmospheric pressure to form a second unburned composite having a layer thickness of 5 to 30 μm and thus to obtain a two-layered unburned composite.

[Production of Polyimide Resin-Fine Particle Composite (Burning Step)]

The dried unburned composite (or the two-layered unburned composite; the same shall apply hereinafter) is subjected to heat post treatment (burning) to form a composite film composed of a polyimide-based resin and fine particles (a polyimide resin-fine particle composite). When the varnish contains a polyamide acid, preferably, imidization is completed at the step of burning. The burning step is an optional step. In particular, when polyimide or polyamideimide is used as a varnish, the burning step may be omitted.

The burning temperature varies depending on the structure of the polyamide acid or polyimide-based resin contained in the unburned composite or the presence or absence of a condensing agent, but is preferably from 120 to 400° C., more preferably from 150 to 375° C.

In burning, the burning step is not necessarily separated from the drying step. For example, when burning is carried out at 375° C., methods usable herein include a method comprising raising the temperature from room temperature to 375° C. over a period of 3 hours, keeping the material at 375° C. for 20 min, or a stepwise drying-thermal imidization method comprising raising the temperature stepwise from room temperature to 375° C. (keeping each step for 20 min) and finally keeping it at 375° C. for 20 min. At that time, a method in which the end of the unburned composite is fixed to SUS frame or the like for deformation prevention purposes may also be adopted.

The thickness of the finished polyimide resin-fine particle composite can be determined by measuring and averaging the thicknesses of a plurality of portions with a micrometer or the like, for example, in the case of a film. A preferred average thickness varies deepening upon the use of the polyimide resin-microparticle composite or the polyimide resin porous body. For example, when the product is used in separation materials, adsorbent materials or the like, a small thickness is preferred. For example, the thickness may be 1 μm or more, preferably 5 to 500 μm, further preferably 8 to 100 μm.

[Particulate Removing Step (Pore Formation of Polyimide Resin-Fine Particle Composite)]

Polyimide-based resin porous bodies having micropores can be manufactured with favorable reproducibility by removing the fine particles from the polyimide resin-microparticle composite by an appropriately selected method. For example, when silica is used as the fine particles, the polyimide resin-fine particle composite can be made porous by dissolving and removing silica with low-concentration hydrogen fluoride water (HF) or the like. On the other hand, when the fine particles are resin fine particles, the resin fine particles can be removed by heating the material to a temperature equal to or above the thermal decomposition temperature of the resin fine particles as described above and below the thermal decomposition temperature of the polyimide resin to decompose the resin fine particles.

[Imide Bond Opening Step]

The method for manufacturing a polyimide-based resin porous body of the present invention includes an imide bond opening step as described above. Specifically, this step may be carried out by (a) a method in which, before the fine particle removing step, the polyimide-based resin-fine particle composite is subjected to the imide bond opening step, or alternatively, (b) a method in which, after the fine particle removing step, the polyimide-based resin molded body that has been rendered porous by the step is subjected to the imide bond opening step. In the manufacturing method (a), the imide bond that exists on the outer surface and near the outer surface of the polyimide-based resin molded body can be opened and the object of the present invention can be attained. The latter method (b), however, is preferred because the porosity of the resultant polyimide-based resin porous body can be enhanced.

The imide bond opening step can be carried out by a chemical etching method, a physical removal method, or a combination thereof. The chemical etching method is not particularly limited, and for example, a publicly known method can be used.

An example of the chemical etching method may include treatment with a chemical etching solution such as an inorganic alkaline solution or an organic alkaline solution. Inorganic alkaline solutions are preferred. Examples of inorganic alkaline solutions include a hydrazine solution containing hydrazine hydrate and ethylenediamine, a solution of an alkali metal hydroxide such as potassium hydroxide, sodium hydroxide, sodium carbonate, sodium silicate, sodium metasilicate, etc., an ammonia solution, and an etching solution composed mainly of an alkali hydroxide, hydrazine and 1,3-dimethyl-2-imidazolidinone as main components. Examples of organic alkaline solutions include primary amines such as ethylamine and n-propylamine; secondary amines such as diethylamine and di-n-butylamine; tertiary amines such as triethylamine and methyldiethylamine; alcohol amines such as dimethyl ethanol amine and triethanolamine; quaternary ammonium salts such as tetramethylammonium hydroxide and tetraethylammonium hydroxide; and cyclic amines such as pyrrole and piperidine.

For solvents of each of the solutions, pure water and alcohols can be appropriately selected. It is also possible to use those in which an appropriate amount of surfactant has been added. The alkali concentration is, for example, 0.01 to 20% by mass.

Further, physical methods include, for example, plasma etching (oxygen, argon, etc.), dry etching by corona discharge, or the like.

The above methods are preferred because they can be applied to any imide bond opening step before the fine particle removing step or after the fine particle removing step. When the chemical etching method is carried out after the fine particle removing step, interconnected pores can easily be formed within the polyimide-based resin porous body, contributing to improved porosity.

When the chemical etching method is used as the imide bond opening step, a washing step of the polyimide-based resin porous body may be carried out again to remove excessive etching liquid components. Washing after chemical etching may be performed by washing with water alone. However, a combination of acid washing and/or water washing is preferred. The polyimide-based resin porous body may be again subjected to the burning step to improve the wettability of the surface of the polyimide-based resin porous body by the organic solvent and to remove the remaining organic substances. As with burning conditions in [manufacture of polyimide resin-fine particle composite (burning step)], burning conditions may be properly determined.

[Polyimide-Based Resin Porous Body]

The polyimide-based resin porous body of the present invention is a porous body composed mainly of polyimide and/or polyamideimide having at least one group selected from the group consisting of a carboxy group, a salt-type carboxy group, and an —NH— bond. The porosity is expressed, for example, by the following physical property values.

The polyimide-based resin porous body of the present invention can be obtained as a porous body having, for example, an average pore diameter of 100 to 2000 nm, and the average pore size is preferably 200 to 1000 nm, more preferably 300 to 900 nm. In the present specification, the average pore diameter is a value obtained by obtaining the average change in size of the average interconnected pores by a porometer for the one subjected to the chemical etching treatment, and obtaining the actual average pore size from the value, but as in the case of polyamideimide. In the case where the above-mentioned chemical etching is not performed, the average particle diameter of the fine particles used for manufacturing the porous body can be taken as the average pore diameter.

The polyimide-based resin porous body of the present invention can be obtained as a porous body having a porosity of, for example, 50 to 90% by mass, preferably 55 to 80% by mass, as determined by a method that will be described later.

The Gurley air permeability of the polyimide resin porous body of the present invention can be brought to, for example, 1000 sec or less, preferably 600 sec or less, more preferably 500 sec or less, most preferably 300 sec or less. The lower the Gurley air permeability, the better the results. Accordingly, the lower limit of the Gurley air permeability is not set. Preferably, however, the Gurley air permeability is, for example, 30 sec or more, from the viewpoint of efficiently performing treatment such as metal removal while maintaining a high flow rate of the fluid passing through the polyimide-based resin porous body. When the Gurley air permeability is 1000 sec or less, the porosity is high enough to allow the material to be used, for example, as separation materials or adsorbent materials.

[Use of Polyimide-Based Resin Porous Body]

The polyimide-based resin porous body of the present invention is a porous body composed mainly of polyimide and/or polyamideimide having at least one group selected from the group consisting of a carboxy group, a salt-type carboxy group, and an —NH— bond. As described above, the porous body has a high porosity, and, thus, is suitable as separation materials and adsorbent materials. The polyimide-based resin porous body of the present invention is a porous body, and is preferably a porous body containing pores having a curved surface as an inner surface, as described above, and the pores having the curved surface are interconnected pores. Accordingly, it is considered that, when a fluid is allowed to pass through the porous body, a substance such as metal particles or the like existing in the fluid are likely to be adsorbed onto the pores and/or the interconnected pores. Since the polyimide-based resin porous body of the present invention further has at least one group selected from the group consisting of a carboxy group, a salt-type carboxy group, and an —NH— bond, it is considered that metal particles contained in a fluid, for example, metal ions or metal agglomerates (for example, agglomerates of metal oxides and agglomerates of metals and organic materials) can easily be attracted by charge or Coulomb force, and adsorption to pores in the porous body and/or the porous body can be promoted and, further, the porous body can also be functioned as an ion exchange resin.

Since the polyimide-based resin porous body of the present invention is a porous body having a high porosity as described above, a method of performing separation and/or adsorption using the polyimide and/or polyamideimide porous body is suitable for use in methods for separation and/or adsorption. In the present specification, "separation" may include at least one selected from the group consisting of filtration, isolation, removal, trapping, purification and sieving, can be utilized for various industrially available treatments including "separation" of any of these, and can be used for waste water treatment, for example. The polyimide-based resin porous body of the present invention is suitable for use in treatment in which both separation and adsorption are carried out, for example, treatment by which minute substances are separated from a fluid containing the minute substances by adsorbing the minute substances, for example, on pores and/or interconnected pores of the porous body. Such a separation material and/or adsorbent material comprising a polyimide-based resin porous body is also one of the present invention.

As described above, since the polyimide-based resin porous body of the present invention is a porous body containing pores having an average pore size preferably in the order of several hundreds of nanometers, for example, even minute substances in nanometer units can be adsorbed or trapped in pores and/or interconnected pores in the porous body. Therefore, the polyimide-based resin porous body of the present invention can be used also in the field of semiconductor manufacturing, particularly in the field of semiconductor manufacturing, which requires extremely fine impurity removal, for example, separation and/or adsorption in semiconductor manufacturing, and impurities contained, for example, in chemical solutions for forming a protective film for modifying a substrate, chemical solutions such as a cleaning solution for a silicon wafer, chemical solutions containing a photosensitive material such as a resist composition, and starting material solutions for photosensitive materials such as resin solutions, for example, contaminant metals such as iron and nickel can be removed at a significantly high removal rate.

The polyimide-based resin porous body of the present invention can be suitably used, for example, as a filter medium and other filtering materials, specifically, it can be used alone or as a filtering material, and the other functional layer). Alternatively, it may be used as a membrane to be combined with another filter medium, for example, it may be used as a membrane for use in a filter device or the like. The functional layer that can be used in combination with the polyimide-based resin porous body of the present invention is not particularly limited, and examples thereof include nylon membranes, polytetrafluoroethylene (PTFE) membranes, tetrafluoroethylene/perfluoroalkylvinylether copolymer (PFA) films, membranes modified with them or the like having a chemical or physicochemical function.

The polyimide-based resin porous body of the present invention is also suitable for a filter medium such as a metal filter used in the field of semiconductor manufacturing, for example, and can also be used for a laminate including the filter medium and another filter material and can also be used suitably for a filter device. The filter device is not particularly limited, but in the filter device, the polyimide-based resin porous body of the present invention is arranged so that the feed liquid and the filtrate cross each other. In relation to the liquid flow path, the porous body may be arranged in parallel to the flow path or may be arranged to intersect. Regions before and after passing the polyimide resin porous body are appropriately sealed so that the feed solution is separated from the filtrate. For example, as a method of sealing, the polyimide-based resin porous body of the present invention may be adhered by light (UV) curing or adhesion by heat (including adhesion due to an anchor effect (thermal welding or the like)). Alternatively, the polyimide resin porous body of the present invention and another filter material (filter) can be adhered, for example, by an incorporation method or the like. The polyimide-based resin porous body may be further provided in an outer container made of a thermoplastic resin such as polyethylene, polypropylene, tetrafluoroethylene perfluoroalkylvinylether copolymer (PFA), polyethersulfone (PES), polyimide, polyamideimide or the like.

The polyimide-based resin porous body of the present invention can be suitably used for removing metals contained in the aforementioned chemicals and the like used in the field of semiconductor manufacturing. For metals, the iron and nickel removal rates are particularly high, and, for iron, the metal removal rate is, for example, 90% or more, preferably 95% or more, more preferably 97% or more, and, for nickel, the metal removal rate is about 90% or more, preferably 95% or more, more preferably 97% or more. The upper limit of the metal removal rate is not specifically set but is preferably as high as possible; however, the upper limit thereof for iron can be set to, for example, less than 100%, or ordinarily 99% or less, and the upper limit thereof for nickel can be set to, for example, 100% or less, or 99% or less in some cases.

The polyimide-based resin porous body of the present invention preferably has interconnected pores, more preferably interconnected pores that have an opening in the outer surface of the porous body, are extended through the inside of the porous body and have an opening also on the outer surface on the opposite side (backside) of the porous body. Presence of such interconnected pores in the porous polyimide resin of the present invention can be represented, for example, by, Gurley air permeability, and the Gurley air permeability can be, for example, 30 to 1000 sec.

When the polyimide-based resin porous body of the present invention is used for removing metals contained in the above-mentioned chemicals and the like used in the semiconductor manufacturing field, the polyimide-based resin porous body of the present invention is preferably subjected to a metal removal treatment. In this case, the flow rate is not particularly limited, and the flow rate of pure water pressurized at 0.08 MPa at room temperature may be 1 ml/min or more, preferably 3 ml/min or more, more preferably 5 ml/min or more, particularly preferably 10 ml/min or more. The upper limit is not particularly limited, and may be, for example, 50 ml/min or lower.

The polyimide-based resin porous body of the present invention is a porous body containing polyimide and/or polyamideimide as a main component and thus is also excellent in mechanical properties such as stress resistance and fracture elongation. For example, the stress is preferably 10 MPa or more, more preferably 15 MPa or more, still more preferably 15 to 50 MPa, and the elongation at break may be, for example, 10% GL or more, preferably 15% GL or more. The upper limit of the fracture elongation can be, for example, 50% GL, preferably 45% GL, more preferably 40% GL. When the porosity is lowered, the fracture elongation is likely to be increased.

EXAMPLES

The present invention will be described more specifically with reference to Examples. However, the scope of the present invention is not limited to these Examples.

In the Examples and Comparative Examples, the following tetracarboxylic dianhydride, diamine, polyamide acid, polyamideimide, organic solvent, dispersant and fine particles were used. The particle size distribution index (d25/75) of silica (1) is about 3.3, and the particle size distribution index (d25/75) of silica (2) is about 1.5.

Tetracarboxylic dianhydride: pyromellitic dianhydride
Diamine: 4,4'-diaminodiphenyl ether
Polyamide acid solution: reaction product of pyromellitic acid dianhydride and 4,4'-diaminodiphenyl ether (solid content: 21.9% by mass (organic solvent: N,N-dimethylacetamide))
Polyamideimide solution: Polyamideimide (Mw: about 30,000; solid content: 14.0% by mass (organic solvent: N-methyl-2-pyrrolidone)) containing trimellitic anhydride and o-tolidine diisocyanate as a polymerization component.
Organic solvent (1): N,N-dimethylacetamide (DMAc)
Organic solvent (2): Gamma butyrolactone
Organic solvent (3): N-methyl-2-pyrrolidone (NMP)
Dispersant: polyoxyethylene secondary alkyl ether-based dispersant
Fine particles: Silica (1): Silica having an average particle size of 700 nm
Silica (2): Silica having an average particle diameter of 300 nm
Etching solution (1): A 1.1% by mass solution of NaOH in a mixed solution composed of methanol:water (mass ratio 3:7)
Etching solution (2): A 0.5% by mass solution of NaOH in a mixed solution composed of methanol:water (mass ratio 1:9)
Etching solution (3): A 1.0% by mass solution of tetramethyl ammonium (TMAH) in a mixed solution composed of methanol:water (mass ratio 4:6)

<Examples 1 to 4> Polyimide Porous Body

[Preparation of Silica Dispersion Liquid-1]
23.1 parts by mass of silica (1) or silica (2) specified in Table 1 was added to a mixture of 23.1 parts by mass of the organic solvent (1) and 0.1 part by mass of the dispersing agent, and the mixture was stirred to prepare a silica dispersion liquid.

[Preparation of Varnish-1]
42.0 parts by mass of the silica dispersion obtained in Preparation 1 of the silica dispersion was added to 41.1 parts by mass of the polyamide acid solution. Further, the organic solvents (1) and (2) were added so that the solvent composition of the entire varnish was organic solvent (1):organic solvent (2)=90:10, and the mixture was stirred to prepare a varnish. In the obtained varnish, the volume ratio between the polyamide acid and silica is 40:60 (mass ratio is 30:70).
[Film Formation of Unburned Composite]

The above varnish was formed as a base material on a polyethylene terephthalate (PET) film using an applicator. The film was prebaked at 90° C. for 5 min to prepare an unburned composite (unburned composite film) having a film thickness of 40 µm. After dipping in water for 3 min, the unburned composite membrane was pressed through between two rolls. At that time, the roll restraining pressure was 3.0 kg/cm$^2$, the roll temperature was 80° C., and the moving speed of the unburned composite film was 0.5 m/min. The unburned composite was removed from the substrate to obtain an unburned composite.
[Imidization of Unburned Composite]

The unburned composite film was heat-treated (burned) for 15 min at a temperature specified in Table 1 for imidization to obtain a polyimide-fine particle composite.
[Formation of Polyimide Porous Body]

The polyimide-fine particle composite obtained above was dipped in a 10% HF solution for 10 min to remove fine particles contained in the film, followed by washing with water and drying to obtain a polyimide porous body.
[Chemical Etching]

In the imide bond opening step, according to chemical etching conditions specified in the "CE" column of Table 1, the polyimide porous body was dipped in a predetermined chemical etching solution for a prescribed period of time and subjected to an imide bond opening step to obtain a polyimide porous membrane as the polyimide porous body. Chemical etching conditions specified in Table 1 are as follows. Thereafter, reburning was carried out at a temperature and a time period specified in Table 1. Condition 1: Dipped in etching solution (1) for 2 min
Condition 2: Dipped in etching solution (2) for 5 min <Example 5> Polyamideimide Porous Body

[Preparation of Silica Dispersion 2]

19.3 parts by mass of silica (2), 19.3 parts by mass of organic solvent (3) and 0.1 parts by mass of dispersing agent were mixed together, and the mixture was stirred to prepare a silica dispersion liquid.
[Preparation of Varnish-2]

35.0 parts by mass of the silica (2) dispersion obtained in Preparation 2 of the silica dispersion was added to 53.6 parts by mass of the polyamideimide solution. Further, the organic solvents (1) and (3) were added so that the solvent composition of the entire varnish was organic solvent (1):organic solvent (3)=5:95, and the mixture was stirred to prepare a varnish. In the obtained varnish, the volume ratio between the polyamide acid and silica is 40:60 (mass ratio is 30:70).
[Film Formation of Unburned Composite]

A film was formed by applying the varnish on a PET film with an applicator. The film was prebaked at 90° C. for 5 min to prepare an unburned composite (unburned composite film) having a film thickness of 40 µm. After dipping in water for 3 min, the unburned composite membrane was pressed through between two rolls. At that time, the roll restraining pressure was 3.0 kg/cm$^2$, the roll temperature was 80° C., and the moving speed of the unburned composite film was 0.5 m/min. The unburned composite was removed from the substrate to obtain an unburned composite. The polyamideimide-fine particle composite was heat-treated (burned) at 280° C. to obtain a polyamideimide-fine particle composite.
[Formation of Porous Polyamideimide Membrane]

The polyimide-fine particle composite obtained above was dipped in a 10% HF solution for 10 min to remove fine particles contained in the film, followed by washing with water and drying to obtain a porous polyamideimide membrane. Thereafter, chemical etching and reburning as the imide bond opening step were not carried out, and the porous membrane was provided as a polyamideimide porous body (polyamideimide porous membrane).

<Comparative Examples 1 to 2> Porous Membrane of Other Resin

A porous membrane made of polyamide (nylon) (pore size: about 10 nm or less, film thickness about 75 µm) as Comparative Example 1 and a polyethylene porous membrane (pore size: about 10 nm or less, film thickness about 50 µm) as Comparative Example 2 were provided.
<Evaluation>

For the porous membranes provided above, the following evaluation was carried out.
[Porosity]

The mass of the fine particles with respect to the total mass of each resin and fine particles used in the production of each porous membrane was regarded as the porosity (% by mass).
[Imidization Ratio]

For the porous film subjected to the chemical etching treatment as the imide bond opening step, the porous film was reburned at the temperature specified in Table 1 for 15 min. Thereafter, a value (X2) was determined by dividing the area of a peak representing the imide bond measured by the Fourier transform infrared spectroscopy (FT-IR) apparatus by the area of a peak representing benzene measured also by the FT-IR apparatus. A value (the above X1) measured for a porous membrane prepared from the same varnish used in each of the porous membranes (a membrane for which the imidization reaction was substantially completed and the chemical etching treatment was not carried out) was determined, and the unconversion rate (%) was determined. The unconversion rates and X2 values were summarized in Table 1.
[Stress Resistance and Fracture Elongation]

Each porous membrane was cut into a size of 3 cm×3 mm to obtain a rectangular sample. The stress at break (MPa; tensile strength) and fracture elongation (% GL) of this sample were evaluated using EZ Test (manufactured by Shimadzu Corporation). The results are summarized in Table 1.
[Metal Removal Rate]

Each metal impurity-containing liquid prepared by adding iron and nickel to pure water was measured for each content (A) of iron and nickel of the solution and then passed through the prepared porous membranes as a filter, the amount of metallic impurities (B) of the liquid after passing was measured, and the value represented by the following formula was regarded as the metal removal rate (%)
The results are shown in Table 1.

$(A-B)/B \times 100$

[Flow Rate]

Each of the porous membranes was cut into a circle having a diameter of 47 mm and used as a filter material, and pure water was passed therethrough under nitrogen pressurization at 0.08 MPa, and the flow rate (ml/min) was measured. The results are summarized in Table 1.

[Gurley Air Permeability]

For each of the above porous membranes, a sample having a thickness of about 40 μm was cut into 5 cm squares. The time for 100 ml of air to pass through the sample was measured with a Gurley densometer (manufactured by Toyo Seiki Seisaku-Sho, Ltd.), according to JIS P 8117. The results are summarized in Table 1.

[Solvent Resistance]

Test pieces of the same polyimide porous body as in Examples 1 and 2 were prepared and the influence after dipping in butyl acetate and cyclohexanone at room temperature for 24 hours was confirmed. Specifically, the rate of decrease in tensile strength after immersion when the tensile strength before immersion was taken as 100% was determined. The tensile strength was measured in the same manner as the method of measuring the stress at break. It could be confirmed that the decreasing rate of the tensile strength was less than 1% in any solvent and there was almost no influence by the solvent.

In addition, by the solvent resistance test, it was confirmed that the polyimide porous body was resistant to butyl acetate and cyclohexanone. In general, butyl acetate is not used for polyethylene type filters, and use of cyclohexanone in polyethylene type filters and nylon type filters is avoided. Accordingly, there is a possibility that, when these solvents are purified, polyimide porous body can be applied as separation materials.

Example 6

A filter device provided with the same polyimide porous body as in Example 2 was provided.

Example 7

A polyimide porous body was obtained in the same manner as in Example 2, except that the etching solution (3) was used as the chemical etching solution. The imidization ratio of X2 of the obtained polyimide porous body was 1.51. The Gurley air permeability was 230 sec. A filter device comprising the polyimide porous body was provided.

TABLE 1

| | Resin | Silica | Layer thickness | Burning (15 min) | CE | Reburning (15 min) | Air permeability (sec) | Flow rate (ml/min) | Stress (MPa) | Fracture elongation (% GL) | Imidation rate of X2 (Unconversion rate (%)) | Metal removal rate Fe (%) | Ni (%) |
|---|---|---|---|---|---|---|---|---|---|---|---|---|---|
| Example 1 | Polyimide | (1) | 40 μm | 340° C. | 1 | 340° C. | 90.5 | 25.0 | 17.2 | 30.1 | 1.43 (93.04) | 98.6 | 100 |
| Example 2 | | (2) | 40 μm | 340° C. | 1 | 340° C. | 161.1 | 11.5 | 16.5 | 36.4 | 1.43 (93.04) | 98.0 | 97.4 |
| Example 3 | | (2) | 40 μm | 340° C. | 2 | 340° C. | 250.4 | 7.4 | 19.4 | 36.3 | 1.47 (95.82) | 95.5 | 98.7 |
| Example 4 | | (2) | 40 μm | 300° C. | 1 | 300° C. | 96.5 | 20.0 | 12.6 | 21.7 | 1.32 (86.12) | 97.3 | 98.7 |
| Example 5 | Polyamide-imide | (2) | 40 μm | 280° C. | Free | Free | 439.2 | 5.2 | 32.2 | 12.5 | — | 95.3 | 100 |
| Comparative Example 1 | Nylon | — | About 75 μm | — | — | — | — | 5.5 | — | — | — | 0.0 | 0.0 |
| Comparative Example 2 | Polyethylene | — | About 50 μm | — | — | — | — | 8.0 | — | — | — | 37.0 | 0.0 |

From Table 1, it was found that, in each Example, the metal removal rate was far superior to that of the Comparative Examples. From Example 1 and Example 2, it was found that, when the average pore size is large, both the flow rate and the metal removal rate (adsorption rate) can be improved. From Example 2 and Example 3, it was found that the condition 1 is better as the condition for the chemical etching as the imide bond opening step than the comparatively weak condition 2. From Example 2 and Example 4, when the imidization rate was lowered according to the chemical etching condition 1 as the imide bond opening step, the flow rate could be improved while maintaining the metal removal rate (adsorption rate) well. From Example 5, it was found that the metal removal rate (adsorption rate) could be improved while maintaining the flow rate on a level comparable with the Comparative Example even when the chemical etching as the imide bond opening step was not carried out. This is considered to be due to the —NH— bond possessed by the polyamideimide.

Comparative Example 3

A filter device (Dispo, manufactured by Pall Corporation) having a porous membrane made of polyamide (nylon) (pore size: about 20 nm) was provided.

<Evaluation>

With respect to each filter device prepared according to Examples 6 and 7 and Comparative Example 3, the following evaluation was carried out using the liquid passage object specified in Table 2.

[Metal Removal Rate]

The following resin solution and chemically amplified resist composition were prepared and the metal removal rate was evaluated. The metal removal rate was obtained by the same equation as the evaluation of the metal removal rate. The iron content of the resin solution or chemically amplified resist composition before flowing was defined as (A) and the amount of iron impurities in the liquid after passing through each of the prepared filter devices was regarded as (B). In all cases, filtration conditions were set at a filtration pressure of 1.0 kgf/cm² (9.8 N/cm²) at room temperature.

• Resin Solutions (1) to (3)

4% by mass resin solutions prepared by dissolving each of propylene glycol monomethyl ether acetate:propylene glycol monomethyl ether=60:40 (mass ratio).

Polymer compound (1)

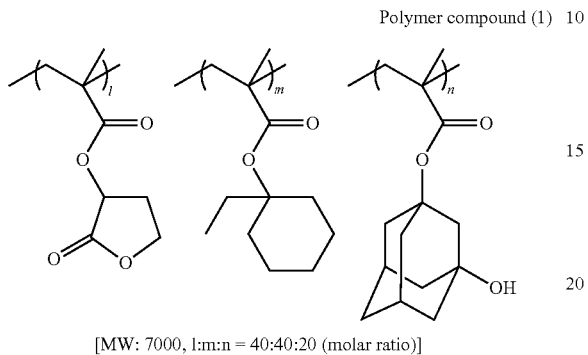

[MW: 7000, l:m:n = 40:40:20 (molar ratio)]

Polymer compound (2)

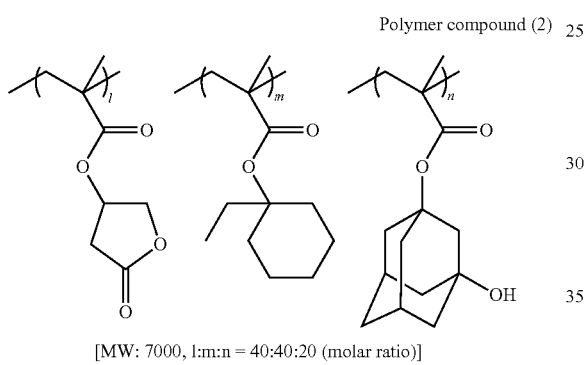

[MW: 7000, l:m:n = 40:40:20 (molar ratio)]

Polymer compound (3)

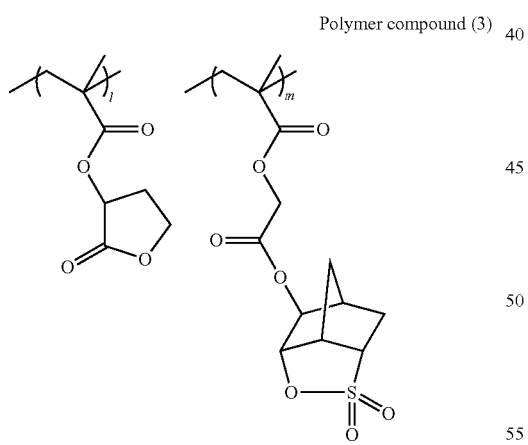

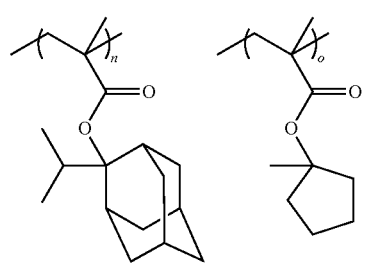

-continued

[MW: 7000, l:m:n:o:p = 35:27:18:13:7 (molar ratio)]

—Chemically Amplified Resist Composition (1)

100 parts by mass of the polymer compound (1), 3.6 parts by mass of the following acid generator (1) and 0.4 parts by mass of tri-n-octylamine were mixed with a mixed solvent composed of propylene glycol monomethyl ether acetate: propylene glycol monomethyl ether=60:40 (mass ratio) to regulate the solid content so that the solid content of the polymer compound (1) was about 7%, thereby obtaining a chemically amplified resist composition (hereinafter referred to as "resist (1)").

Acid generating agent (1)

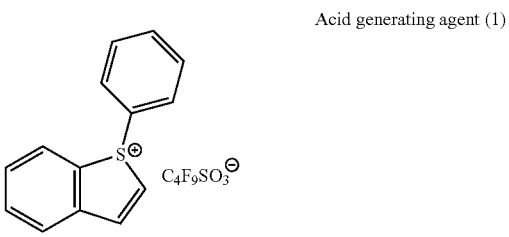

TABLE 2

| | Filter device | Flow object | Metal removal rate (%) |
|---|---|---|---|
| Example 6-1 | Example 6 | Resin solution (1) | 100 |
| Comparative Example 3-1 | Comparative Example 3 | Resin solution (1) | 79.2 |
| Example 6-2 | Example 6 | Resist (1) | 97.5 |
| Comparative Example 3-2 | Comparative Example 3 | Resist (1) | 80.5 |
| Example 7-1 | Example 7 | Resin solution (2) | 65.8 |
| Comparative Example 3-3 | Comparative Example 3 | Resin solution (2) | 35.8 |
| Example7-2 | Example 7 | Resin solution (3) | 67.9 |
| Comparative Example 3-4 | Comparative Example 3 | Resin solution (3) | 14.7 |

It was found by Table 2 that, in each of the Examples, the metal removal rate was far superior to that of the Comparative Examples even when the object to be passed was a resin solution or a resist composition.

The invention claimed is:

1. A polyimide and/or polyamideimide porous body comprising at least one group selected from the group consisting of a carboxy group, a salt-type carboxy group, and an —NH— bond, wherein the polyimide and/or polyamideimide porous body has an unconversion rate of 70 to 99.5% as determined by the following formula:

unconversion rate (%)=($X2$)÷($X1$)×100, wherein X2 is a value obtained by dividing an area of a peak representing an imide bond as measured by Fourier transform infrared spectroscopy (FT-IR) by an area of a peak representing benzene as measured by FT-IR for the polyimide and/or polyamideimide porous body produced by ring-opening of a part of imide bonds in the polyimide and/or polyamideimide porous body, with the proviso that when a varnish for preparing the polyimide and/or polyamideimide porous body contains a polyamic acid, an imidization reaction is regarded as having been substantially completed in a firing step, and wherein X1 is a value obtained by dividing an area of a peak representing the imide bond as measured by FT-IR by an area of a peak representing benzene as measured by FT-IR for the polyimide and/or polyamideimide prior to being subjected to the ring-opening.

2. The polyimide and/or polyamideimide porous body according to claim 1, which is a porous body comprising pores having a curved surface as an inner surface.

3. The polyimide and/or polyamideimide porous body according to claim 2, wherein the pores having the curved surface form an interconnected pore.

4. The polyimide and/or polyamideimide porous body according to claim 1, wherein the polyimide and/or polyamideimide has at least one group selected from the group consisting of structural units represented by the following formulae (3) to (6):

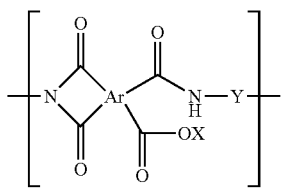

(3)

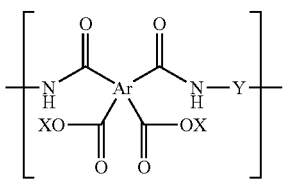

(4)

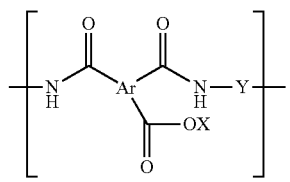

(5)

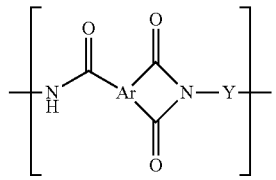

(6)

wherein X's may be the same or different and are a hydrogen atom or a cation moiety; Ar is an aryl group; and Y is a divalent residue excluding an amino group of a diamine compound.

5. A method for manufacturing the polyimide and/or polyamideimide porous body according to claim 1, the method comprising forming a carboxy group and/or a salt-type carboxy group from part of an imide bond in the polyimide and/or polyamideimide, such that the polyimide and/or polyamideimide porous body has an unconversion rate of 70 to 99.5%.

6. A method for separation and/or adsorption which may comprise conducting at least one selected from the group consisting of filtration, isolation, removal, trapping, purification, and sieving using the polyimide and/or polyamideimide porous body according to claim 1.

7. The method according to claim 6, wherein the separation and/or adsorption is conducted in manufacturing semiconductors.

8. A separation material comprising the polyimide and/or polyamideimide porous body according to claim 1.

9. An adsorbent material comprising the polyimide and/or polyamideimide porous body according to claim 1.

10. A filter medium comprising the polyimide and/or polyamideimide porous body according to claim 1.

11. A laminate comprising the filter medium according to claim 10 and another filter medium.

12. A filter device comprising the polyimide and/or polyamideimide porous body according to claim 1.

13. The polyimide and/or polyamideimide porous body according to claim 1, wherein X2 is from 1.2 to 2.

* * * * *